United States Patent
Land

[15] 3,651,746
[45] Mar. 28, 1972

[54] FILM ASSEMBLAGE

[72] Inventor: Edwin H. Land, Cambridge, Mass.
[73] Assignee: Polaroid Corporation, Cambridge, Mass.
[22] Filed: July 15, 1970
[21] Appl. No.: 55,119

[52] U.S. Cl. ..................................................95/19, 95/22
[51] Int. Cl. .............................................G03b 17/52
[58] Field of Search ..........................................95/13, 19, 22

[56] References Cited

UNITED STATES PATENTS 3,543,662  12/1970  Erlichman..............................95/11 R Primary Examiner—John M. Horan
Assistant Examiner—Alan A. Mathews
Attorney—Brown and Mikulka, Alfred E. Corrigan and Lawrence G. Norris

[57] ABSTRACT

A film container for housing a plurality of film units and a battery for supplying energy for at least one component in photographic apparatus with which it is adapted to be used. One wall of the container includes two sections which are adapted to be moved into face-to-face relation with each other while the terminals of the battery are located therebetween to properly support the terminals for electrical engagement with contacts located within the photographic apparatus.

17 Claims, 2 Drawing Figures

PATENTED MAR 28 1972 3,651,746

INVENTOR.
EDWIN H. LAND

BY
Brown and Mikulka
and
Alfred E. Corrigan
ATTORNEYS

FILM ASSEMBLAGE

BACKGROUND OF THE INVENTION

1. Field of the Invention

This invention relates to film assemblages of the type including a container for housing a plurality of film units and a battery for supplying energy for a component located within photographic apparatus with which the assemblage is adapted to be used and, more particularly, to a wall structure for properly supporting the terminals of the battery in position for electrical engagement with contacts located within the photographic structure and the method for assembling the assemblage.

2. Description of the Prior Art

The prior art discloses the general concept of combining a film assemblage with a battery for operating components of a camera into which it is adapted to be inserted. For example, see U.S. Pat. No. 3,481,261, wherein a battery is located within a film assemblage for driving a film-winding apparatus. However, providing a film assemblage with a battery has usually resulted in an increase in the size of the film assemblage and the camera into which it is to be inserted. One way of providing a film assemblage with a battery without substantially increasing its overall volume is to manufacture the battery and the film container or cassette such that they have a generally thin, flat configuration. For example, see the copending application of Irving Erlichman, Ser. No. 766,548, filed Oct. 10, 1968, now U.S. Pat. No. 3,543,662 and assigned to the same assignee as the instant application. However, this presents the problem of providing sufficient force between the battery terminals and contacts located within the camera to provide a good electrical connection therebetween without transferring a deleterious amount of this force to the film units.

SUMMARY OF THE INVENTION

The invention relates to a film container which is adapted to house a plurality of film units and a battery, and a method of assembling the same. One wall of the container is comprised of two sections coupled to each other and adapted to be positioned in face-to-face relation with each other while the battery terminals are located therebetween to support the terminals for engagement with contacts located within a camera. The two sections, while positioned in face-to-face relation with the battery terminals supported therebetween, are then moved to a position in which they define one of the walls of the film container.

Accordingly, an object of the invention is to provide, in a compact film container of the type adapted to contain a plurality of film units and a battery, means for supporting the terminals of the battery in a manner which transfers a substantial amount of the forces being applied thereto to the film container.

Another object of the invention is to provide, in a film assemblage of the type including a film container, a plurality of film units and a battery for operating at least one electrical component located within photographic apparatus with which the assemblage is adapted to be used, means including a wall of said container for supporting the terminals of the battery in a manner which substantially isolates forces being applied thereto from being transmitted to the film units or the battery.

Another object of the invention is to provide a novel method for assembling a film assemblage of the type described.

These and other objects of the invention will in part be obvious and will in part appear hereinafter.

The invention accordingly comprises the several steps and the relation and order of one or more of such steps with respect to each of the others, and the product possessing the features, properties, and the relation of elements which are exemplified in the following detailed disclosure, and the scope of the application of which will be indicated in the claims.

BRIEF DESCRIPTION OF THE DRAWING

For a fuller understanding of the nature and objects of the invention, reference should be had to the following detailed description taken in connection with the accompanying drawing wherein.

DETAILED DESCRIPTION OF THE INVENTION

Figure 1:
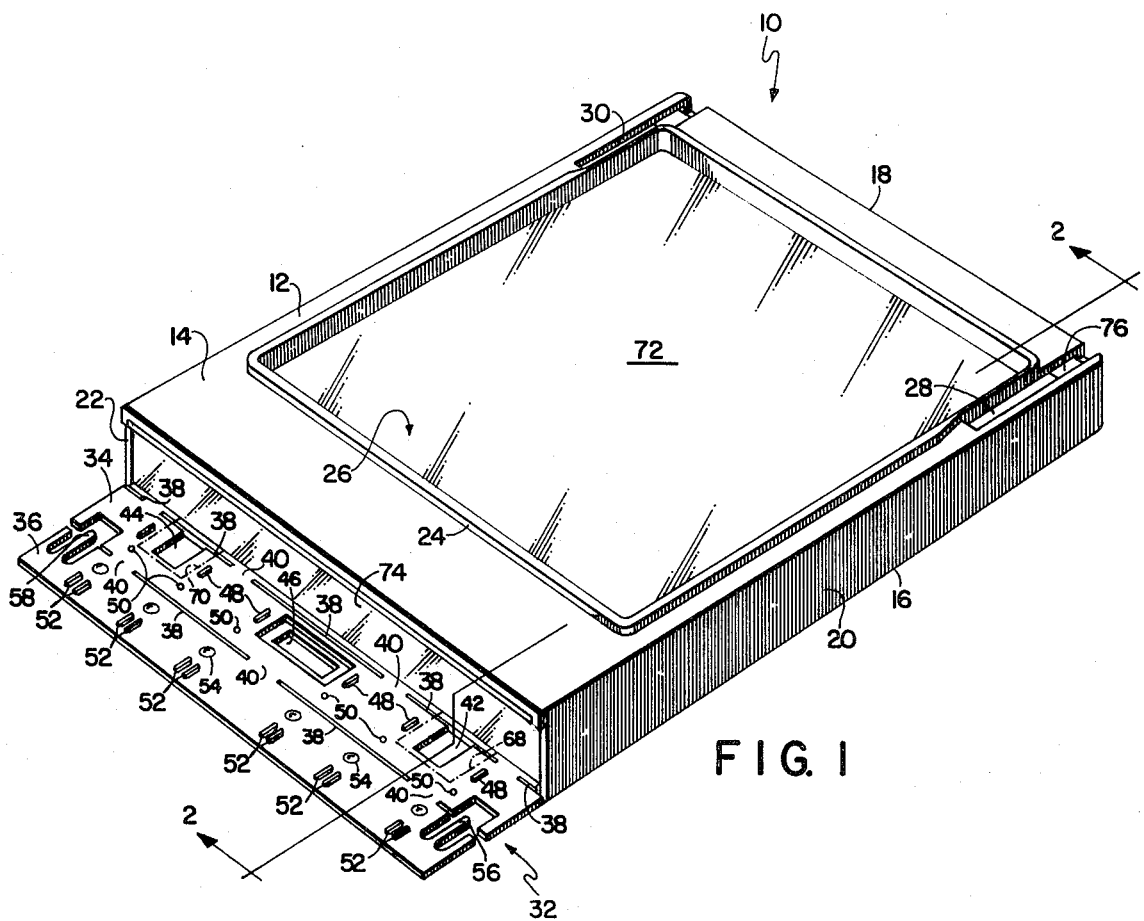
FIG. 1 is a perspective view of a film assemblage shown with its leading end wall in a nonerected condition.

Reference is now made to the drawing wherein is shown a film assemblage 10 of the type adapted for use in photographic apparatus including at least one electrically operated component, e.g., film-advancing apparatus as shown in U.S. Pat. No. 3,511,152, granted May 12, 1970, to Irving Erlichman. Film assemblage 10 includes a film container 12, made from any suitable opaque material, having front and rear walls 14 and 16, respectively, joined by a trailing end wall 18 and side walls 20 and 22. Front wall 14 includes an upstanding rib 24 which defines the boundaries of a light-transmitting section or exposure aperture 26 and a pair of elongated apertures 28 and 30 which extend part way down trailing end wall 18 and are adapted to receive apparatus for engaging and moving a film unit toward the left as viewed in the drawing. A leading end wall 32, including a first section 34, extends from and is coupled to rear wall 16 by an integral hinge defined by elongated apertures 38 separated by portions 40 having a thickness less than that of the material in the immediate area. Leading end wall 32 further includes a second section 36 coupled to first section 34 in the same manner as the latter is coupled to rear wall 16. Walls 16 and 32 lie in the same general plane when the leading end wall 32 is in the nonerected condition shown in FIG. 1.

First section 34 includes a pair of apertures 42 and 44 which are adapted to receive, or be in alignment with, the terminals of a battery located within the container so as to allow electrical contact between elements located on opposite sides of first section 34, i.e., between the battery terminals and electrical contacts located within photographic apparatus with which the assemblage 10 is adapted to be used. Alternatively, the apertures 42 and 44 could be occupied by material capable of carrying an electrical current between the terminals and the contacts. Located intermediate apertures 42 and 44 is a third elongated recessed aperture 46 which is adapted to receive, or be in alignment with, a thermistor as will be explained shortly. Spaced on opposite sides of each aperture 42, 44, and 46 are elongated raised portions 48 and hemispherically shaped depressed portions 50.

Figure 2:
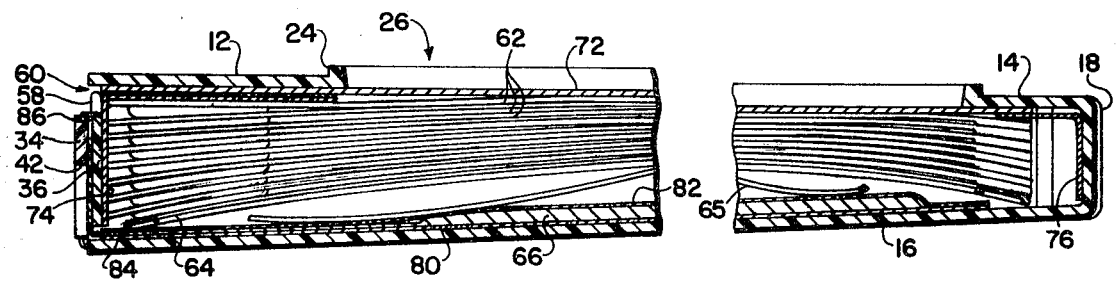
FIG. 2 is an enlarged sectional view taken along the line 2—2 of FIG. 1 with the leading end wall of the film container shown in an erected condition.

Second section 36 includes parallel pairs of raised portions 52, each pair of which is adapted to straddle a raised portion 48, and hemispherically shaped, protuberances 54 which are adapted to partially nest within depressed portions 50 when section 36 is folded into face-to-face relation with section 34 as shown in FIG. 2. Second section 36 further includes a pair of integral stop members 56 and 58 extending therefrom which are adapted to prevent the movement of more than one film unit at a time through a slot 60 in the film container defined by leading end wall 32 and front wall 14.

Positioned within film container 12 are a plurality of film units 62 which may be of the type described in U.S. Pat. No. 3,415,644, granted to E. H. Land on Dec. 10, 1968; a spring platen 64 having legs 65 for urging the forwardmost film unit 62 into position for exposure; a thin, flat battery 66 including terminals 68 and 70 (shown in broken lines in FIG. 1); and an opaque cover sheet 72 including flexible portions 74 and 76 for preventing the passage of actinic light through apertures 26, 28, and 30 and opening 60. As is readily apparent from the drawing, these components, when assembled as shown in FIG. 2, present a thin, compact film assemblage which occupies a minimum of space during storage and in use with a camera.

The battery terminals 68 and 70 are supported independently of the battery 66 to minimize forces being transferred to the film units because of the engagement of the terminals with the electrical contacts located in the aforementioned photographic apparatus. For example, these forces could distort one of the film units to the extent that it could not readily be moved through opening 60 or could sufficiently displace a portion of the film unit out of its position for exposure such that the image would be adversely affected. The battery 66 is mounted on a support 80, e.g., a piece of cardboard, and enclosed by a moisture and vaporproof material 82. Extending from the battery are a pair of insulated conducting strips 84 (only one of which is shown), the ends of which are bared at the terminals 68 and 70. Terminals 68 and 70 are, in turn, frictionally supported within a gap 86 defined by first and second sections 34 and 36.

During assembly, the film container 12 is positioned as shown in FIG. 1 with its leading end wall in a nonerected condition. Next, a sandwich comprised of cover sheet 72, film units 62, spring platen 64, and battery 66 is inserted through the opening normally partially closed by leading end wall 32. With the sandwich thus inserted, the battery terminals 68 and 70 are automatically located as shown in broken lines in FIG. 1, i.e., they are in alignment with apertures 42 and 44. A thermistor for inserting film speed data, as well as temperature-responsive exposure compensation, into the exposure control system of the apparatus may then be placed in the recessed aperture 46 and second section 36 folded 170 degrees about the hinge defined by apertures 38 and portions 40 into face-to-face relation with first section 34. For a more detailed description of such an exposure control system, reference is made to my copending application Ser. No. 878,086, filed Nov. 19, 1969. As the two sections 34 and 36 approach a face-to-face relation, raised portions 48 and 52 and hemispherically shaped portions 50 and 54 coact to properly align the two sections. Heat or sonic energy is then applied to portions 48, 50, 52, and 54 to weld the two sections to each other at these points, thereby securing the battery terminals 68 and 70 and the thermistor therebetween. First and second sections 34 and 36 are then pivoted as a unit about the hinge between sections 34 and rear wall 16 until the unit abuts side walls 20 and 22 at which point it is welded thereto. Leading end wall 32 now constitutes a double wall structure wherein second section 36 functions as a backup or support for the terminals, and first section 34 adds to the rigidity of the wall whereby forces applied to the terminals by the contacts are transferred to the other walls of the film container 12.

From the foregoing, it can be seen that there has been disclosed a novel film assemblage and method for assembling the same. The film assemblage includes a film container including a double wall or sandwich type structure and a thin planar battery having ribbon type terminals which are sandwiched between and supported by the double wall structure. One wall of the double wall structure functions to back up the battery terminals for electrical engagement with contacts located within apparatus with which it is adapted to be used, and the other wall cooperates with the first wall to transfer forces from the battery terminals to the remainder of the film container.

Since certain changes may be made in the above method and article without departing from the scope of the the invention herein involved, it is intended that all matter contained in the above description or shown in the accompanying drawing shall be interpreted as illustrative and not in a limiting sense.

What is claimed is:

1. A container for housing a plurality of film units and a battery, comprising:
    a first wall;
    a first section coupled to and extending from said first wall, said first section including means for enabling electrical contact between elements located on opposite sides of said first section;
    a second section coupled to and extending from said first section; and hinge means connecting said first and second sections for movement between a first position wherein they form an extension of said first wall for allowing the loading of film units into said container and a second position wherein said first and second sections are positioned in face-to-face relationship with each other and define therebetween a gap for receiving and supporting the terminals of the battery, said terminals being positioned in alignment with said means for enabling electrical contact.

2. A container as defined in claim 1 wherein said means enabling electrical contact include aperture means.

3. A container as defined in claim 2 wherein said first and second sections define a second wall of said container when in said second position.

4. A container as defined in claim 3 further including a third wall, said second wall in said second position cooperating with said third wall to define an opening dimensioned to allow movement of a film unit therethrough.

5. A container as defined in claim 4 further including means extending from one of said first and second sections for preventing the movement of more than one film unit at a time through said opening.

6. A container as defined in claim 1 wherein said first and second sections include means for aligning said first and second sections relative to each other.

7. A container as defined in claim 6 wherein said means for aligning are adapted to secure said first and second sections to each other.

8. A container as defined in claim 1 further including means for receiving a thermistor, said means being located between said first and second sections when said sections are in said second position.

9. A film assemblage for use with photographic apparatus of the type including at least one member adapted to be electrically powered and contact means for connecting the member with the terminals of a battery, said assemblage comprising:
    a container for housing a plurality of film units, said container including a double wall structure with one of the walls including means for enabling electrical contact between elements located on opposite sides of said one wall; and
    a substantially planar battery having terminals extending therefrom, said terminals being sandwiched between the walls of said double wall structure with the said means for enabling electrical contact located in alignment with said terminals whereby said terminals are adapted to be placed in electrical contact with contacts located within the photographic apparatus, and the other wall of said double wall structure includes means for locating it to the side of said terminals opposite that in electrical contact for supporting said terminals against the pressure being exerted thereon by the contacts.

10. A film assemblage as defined in claim 9 wherein said double wall structure transfers substantially all of the forces received by the terminals to the remainder of said container.

11. A film assemblage as defined in claim 10 wherein said means for enabling electrical contact include aperture means.

12. A film assemblage as defined in claim 11 wherein said terminals have substantially planar configuration.

13. A film assemblage as defined in claim 12 wherein said double wall structure further includes means for mounting a thermistor therebetween.

14. A film assemblage for use with photographic apparatus of the type including at least one member adapted to be electrically powered and contact means for connecting the member with the terminals of a battery, said assemblage comprising:
    a container for housing a plurality of substantially planar film units arranged in stacked relationship, said container including a wall structure with one of the walls including means for enabling electrical contact between elements located on opposite sides of said one wall;

a substantially planar battery located within said container and having terminals including means extending from the interior of said container toward the exterior of said one wall;

means securing said extending terminal means in supported relationship on said one wall so as to be adapted to be placed in electrical contact with contacts located in said photographic apparatus; and means connecting said one wall in supported relationship with the remaining wall structure of said container so as to cause the transmission directly to the remaining wall structure of said container the contact force externally applied to said extending terminals means as a result of making electrical contact with the contacts in said photographic apparatus.

15. A film assemblage as defined in claim 14 wherein said terminals have a flat, ribbon type configuration.

16. A method for assembling a film assemblage of the type including a film container having a wall comprised of first and second sections coupled to each other and to the remainder of the container, the first section including means for enabling electrical contact between elements located on opposite sides of the first section, a plurality of film units and a battery including terminals, said method comprising the steps of:

positioning said battery and said film units in said container with the terminals of said battery overlying said first section and in alignment with said means for enabling electrical contact;

folding said second section into face-to-face relation with said first section to capture said terminals between said first and second sections;

folding said first and second sections as a unit to a position in which they form a second wall of said container; and securing said second wall to a third wall of said container.

17. The method as defined in claim 16 further including the step of securing said first and second sections to each other while said terminals are located therebetween, thereby minimizing relative movement between said terminals and said sections.

* * * * *